B. M. MATHIAS.
MUD LUG.
APPLICATION FILED MAR. 14, 1918.

1,340,834.

Patented May 18, 1920.
2 SHEETS—SHEET 1.

Inventor
Berton M. Mathias
by C. A. Enochs
Attorney

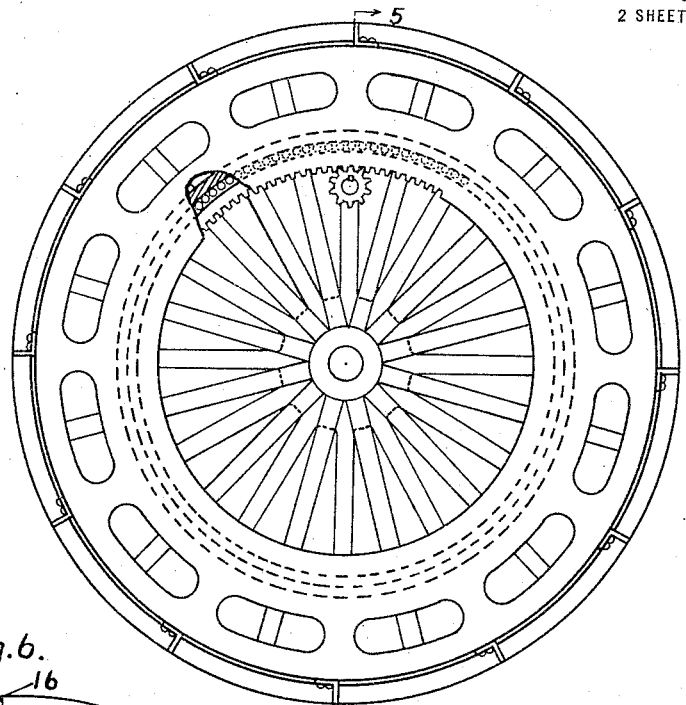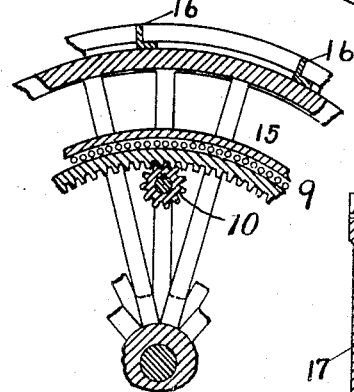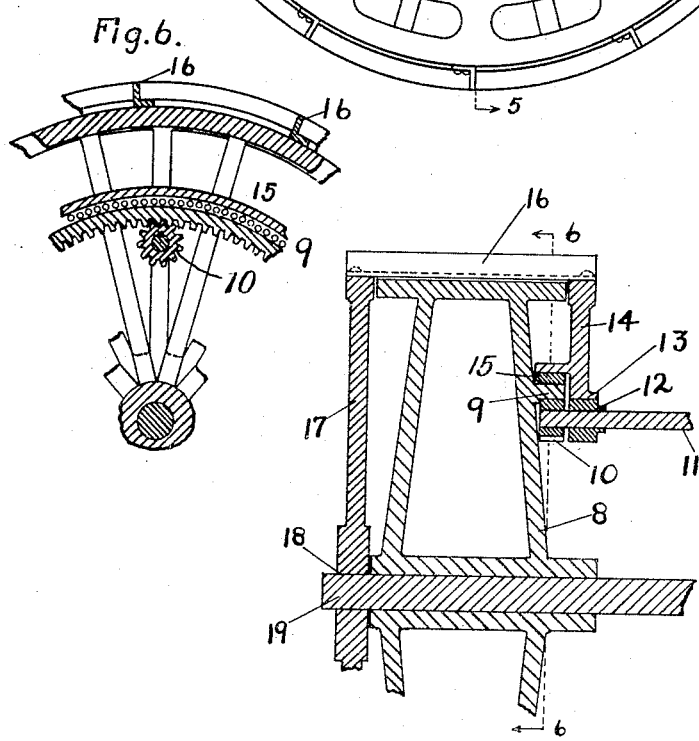

UNITED STATES PATENT OFFICE.

BERTON M. MATHIAS, OF MINNEAPOLIS, MINNESOTA.

MUD-LUG.

1,340,834. Specification of Letters Patent. Patented May 18, 1920.

Application filed March 14, 1918. Serial No. 222,484.

*To all whom it may concern:*

Be it known that I, BERTON M. MATHIAS, a citizen of the United States, and a resident of Minneapolis, in the county of Hennepin and State of Minnesota, have invented certain new and useful Improvements in Mud-Lugs, of which the following is a specification.

One object of my invention is to provide a mud lug that will have a creeping action on the wheel to which it is applied and be readily attached to and removed therefrom.

Another object of my invention is to provide, in a mud lug, automatic means for driving the mud lugs and the driving wheel to which it is applied at different speeds so there will be a creeping action between the two, and hence the wear will be evenly distributed and the wheel and lugs kept free from mud.

With these and incidental objects in view, the invention consists of certain novel features of construction and combination of parts, the essential elements of which are hereinafter described with reference to the drawings which accompany and form a part of this specification.

Figure 1:
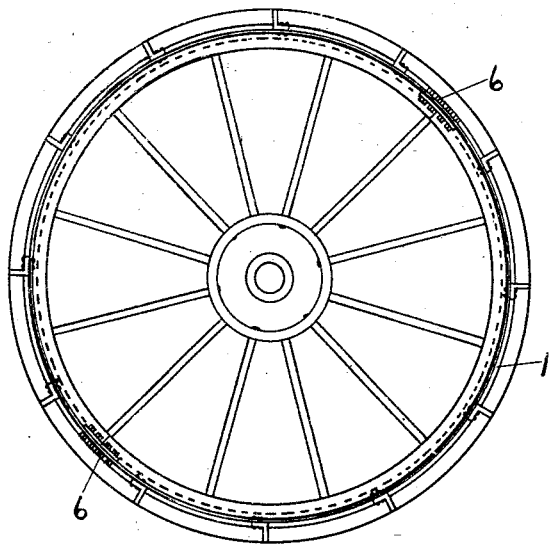
Figure 2:
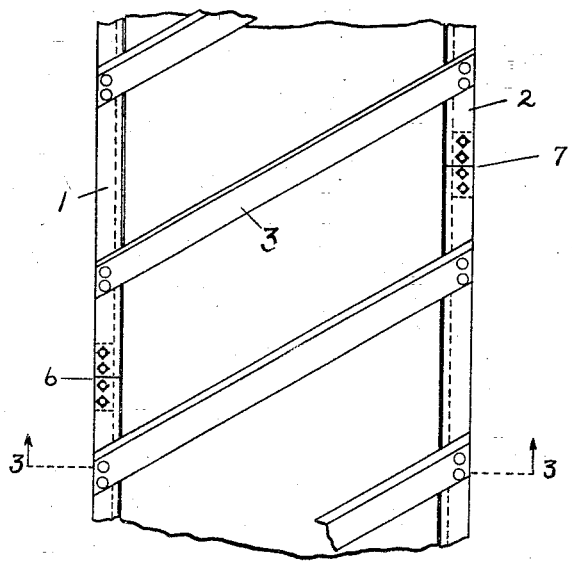
Figure 3:
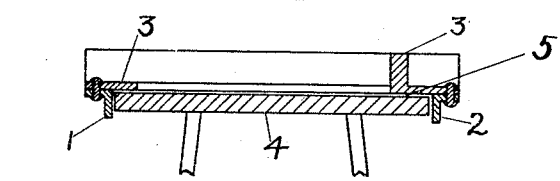

In the drawing Figure 1 is a side elevation of a wheel having the preferred construction of my invention applied thereto. Fig. 2 is an enlarged detail of a portion of the wheel rim and mud lugs. Fig. 3 is a section taken on the line 3—3, Fig. 2. Fig. 4 is a side view, with parts broken away, of a wheel and mud lugs embodying an alternate construction of my invention. Fig. 5 is a section taken on the line 5—5, Fig. 4, with parts broken away, and Fig. 6 is a section taken on the line 6—6, Fig. 5.

I prefer to construct the mud lugs shown in Figs. 1, 2 and 3, by forming a pair of angle rings 1 and 2, each of the rings being preferably made in sections of two or more pieces.

Riveted, or otherwise suitably attached, to these rings is a series of angle bars 3.

Looking at Fig. 3, it will be seen that the angle rings 1 and 2 ride just outside of the rim 4 with a small clearance 5 provided between the rim 4 and the angle bars 3.

The sections of each ring are bolted together as at 6 and 7, so the mud lugs may be readily attached to or removed from the rim 4.

It is apparent that, with such a construction, a squirrel cage-like structure is carried over the rim of the wheel with a small amount of clearance therebetween and as the traction wheel is driven there will be a slight slippage between the rim and squirrel cage that will give a creeping effect between the two, but at the same time there will be a sufficient binding effect and friction set up between the squirrel cage and the rim that there will be no appreciable loss in traction.

In the construction shown in Figs. 4, 5 and 6, means are provided for automatically causing a creeping effect between the squirrel cage and the rim, so the creeping will be a definite amount at all times.

As shown in Fig. 5, the traction wheel 8 carries a bull gear 9, meshing with a pinion 10, driven by the shaft 11, which, in turn, is driven by any suitable means, this construction providing the ordinary means of driving the drive wheel.

The shaft 11 also drives a pinion 12 coacting with a gear 13, and the pinion 12, as shown in the drawing, has ten teeth, while the pinion 10 has eleven teeth, the two gears 9 and 13 being made of proper pitch diameter and teeth to coöperate with their respective pinions.

The gear 13 drives the spider 14, preferably supported by rollers 15 on the outer perimeter of the gear 9, and this spider drives the mud lugs 16, which are supported on their other ends by the spider 17, journaled at 18 on the dead shaft 19.

It is apparent that the spiders 14 and 17, with the mud lug 16, constitute a squirrel cage similar to the ones shown in Figs. 1 and 2, and that this squirrel cage is driven at a slightly lesser number of revolutions than is the wheel 8, so a differential action is established between the wheel and squirrel cage, giving the desired creeping effect that is positive in action and of the same ratio at all times.

While the main idea of this invention is to provide a creeping action between the wheel rim and the mud lugs, it is apparent that the structure described and claimed may be used as a simple set of mud lugs quickly attachable to and detachable from a traction wheel, and may be, if desired, so mounted with the wheel that no creeping action will be effected between the lugs and the rim.

While I have described my invention and illustrated it in two particular designs, I do not wish it understood that I limit myself to these constructions, as it is evident that the application of the invention may be varied in many ways within the scope of the following claims.

Claims:

1. In a traction wheel having driving means, the combination of a squirrel cage structure positioned over the rim of the wheel, and means for driving said squirrel cage structure at a different speed than the wheel is driven.

2. In a traction wheel the combination, with a power driven wheel, of a power driven squirrel cage positioned thereover.

3. In a traction wheel the combination, with a power driven wheel, of a power driven squirrel cage positioned thereover, said squirrel cage being driven at a different speed from that of said wheel.

4. In a traction wheel the combination, with a power driven wheel, of a power driven squirrel cage positioned thereover, said squirrel cage being driven at a less number of revolutions per minute than said wheel.

BERTON M. MATHIAS.